United States Patent
Vrzic et al.

(10) Patent No.: US 7,623,448 B1
(45) Date of Patent: Nov. 24, 2009

(54) SYSTEMS AND METHODS FOR WIRELESS NETWORK NEGOTIATION

(75) Inventors: Sophie Vrzic, Nepean (CA); Kelvin Au, Ottawa (CA); Hongyi Li, Ottawa (CA); Tricci So, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 755 days.

(21) Appl. No.: 11/293,204

(22) Filed: Dec. 5, 2005

Related U.S. Application Data

(60) Provisional application No. 60/632,522, filed on Dec. 3, 2004.

(51) Int. Cl.
*G01R 31/08* (2006.01)
(52) U.S. Cl. ........................ 370/230; 370/231
(58) Field of Classification Search ........................ None
See application file for complete search history.

(56) References Cited

U.S. PATENT DOCUMENTS

| | | | |
|---|---|---|---|
| 6,628,629 B1 * | 9/2003 | Jorgensen | 370/322 |
| 7,092,380 B1 * | 8/2006 | Chen et al. | 370/352 |
| 7,254,399 B2 * | 8/2007 | Salokannel et al. | 455/452.2 |
| 2004/0240426 A1 * | 12/2004 | Wu et al. | 370/350 |

* cited by examiner

*Primary Examiner*—Chi H Pham
*Assistant Examiner*—Fan Ng

(57) ABSTRACT

The invention provides various schemes for negotiating communications between wireless mesh network nodes operating in accordance with the IEEE 802.11e standard. However, more generally, the invention can be operated in accordance with other communication standards.

According to a broad embodiment of the invention, a method is provided in which meeting durations are divided into at least two portions, an uplink transmission portion and a downlink transmission portion. In order to protect the negotiation packets from collisions, the negotiation process is combined with the uplink and downlink data transmissions. In some aspects of the invention, the negotiation process is protected from collisions by using the transmission opportunity (TXOP) protocol that is available in the IEEE 802.11e standard. The inventive methods can be used with a contention based protocol or a contention free based protocol.

According to another broad embodiment of the invention there is provided a wireless network node capable of implementing methods described for negotiating communications between neighbouring nodes.

21 Claims, 10 Drawing Sheets

SYSTEMS AND METHODS FOR WIRELESS NETWORK NEGOTIATION

RELATED APPLICATIONS

This application claims the benefit of U.S. Provisional Patent Application No. 60/632,522 filed on Dec. 3, 2004, hereby incorporated by reference in its entirety.

FIELD OF THE INVENTION

The invention relates to the field of wireless communications, more specifically to negotiating transmission times between nodes in wireless networks.

BACKGROUND OF THE INVENTION

In a wireless mesh network, a node can have several neighbours with which to communicate. In such a network, pairs of neighbouring nodes arrange times during which to communicate and the duration of such meetings. This meeting duration is sometimes referred to as a slot time. When the meeting duration for communicating with a given neighbour has expired, a node then switches to communicate with its next neighbour. The time to cycle through all of the neighbours is called a cycle time.

Communications between nodes typically includes information for negotiating the start time and duration of a next meeting as well as uplink and downlink data transmission. It is beneficial to minimize the time required to perform the negotiation.

If the data transfer is unidirectional at a given time, the initiating node of the negotiation sends its negotiation information in a negotiation request message. The node responding to the request then sends its negotiation information back to the initiating node. This is then followed by a confirmation message by the initiating node. This process is known as a 3-way handshaking process.

If the data transfer is bidirectional, there are only two messages. The initiating node sends its negotiation information. The responding node then determines the next meeting time and duration based on the negotiation information sent by the initiating node and sends confirmation of the determined meeting time and duration to the initiating node. In this case, the negotiation process is a 2-way handshaking process.

In a particular negotiation process that is the result of applying 802.11 contention mechanisms to mesh networks the entire negotiation process is performed before the start of communication between the nodes within a given slot time. FIG. 1 will now be used to illustrate a known negotiation method of communication between two neighbouring nodes for one slot time 100. For each pair of neighbouring nodes there is a downlink (DL) and an uplink (UL) communication. While nodes of a mesh network are not typically considered to have DL and UL directionality based on the connectivity of a mesh, in this context the DL direction is used to refer to the direction of the initial negotiation request and the UL direction is used to refer to the direction of the negotiation confirmation or response.

Contention mechanisms in IEEE 802.11 are used by nodes in a network to obtain a communication medium over which the nodes will communicate. When there are multiple nodes, the nodes need to contend for the medium to determine which node can use the communication medium at a particular time and for a particular duration. Since the whole point of the negotiation process is to schedule a subsequent time for two nodes to communicate, it may be expected that only these two nodes would be contending for the communication medium at the subsequent scheduled time. However, it is possible that there are other nodes in proximity of the two nodes with the scheduled meeting time that are not privy to the fact that the two nodes have established a scheduled meeting time. Not being privy to such information of a scheduled meeting, these other nodes may attempt to obtain the communication medium for their own use.

A typical slot time includes a DL contention and negotiation portion 110, a UL contention and negotiation portion 120, a DL contention and data transmission portion 130 and a UL contention and data transmission portion 140. During downlink contention and negotiation 110, different nodes contend for the downlink channel. Only once a given node wins out in the contention process does that node then go ahead with the negotiation. Each DL contention involves waiting for a Distributed Coordination Function (DCF) Interframe Space (DIFS) 111 and RBO (random backoff) 112 to ensure that no other communication is occurring at that time on the channel being requested. Because multiple nodes may be contending for the medium during this time, and these nodes may be transmitting packets that collide with each other, the time taken to access the channel can take up a significant portion of the available slot. The illustration only shows a single contention request. However, if there is detected communication, the node continues the contention process until it has successfully obtained the medium. Once the channel is successfully accessed, this is followed by the transmission of a negotiation request (NEG) 113 and the later receipt of an acknowledgement (ACK) 114.

Similarly, during uplink contention and negotiation portion 120, different nodes contend for the uplink channel. Only once a given node wins out in the contention process does that node then go ahead with the negotiation. Each UL contention attempt includes the waiting duration of DIFS 121 and RBO 122. Because multiple nodes may be contending for the medium during this time, and these nodes may be transmitting packets that collide with each other, the time taken to access the channel can take up a significant portion of the available slot. The illustration only shows a single contention request. Once the channel is successfully accessed, this is followed by the transmission of a negotiation response (NEG) 123 and the later receipt of an acknowledgement (ACK) 124.

Once the DL contention and negotiation and UL contention and negotiation are complete, any remaining time left in the scheduled slot is available for data transmission during the DL contention and data transmission portion 130 and the UL contention and data transmission portion 140. However, each data packet transmitted during this remaining part of the slot is also subject to contention for accessing the medium. This is notwithstanding the fact that during the previous slot, a time and duration for both UL and DL transmission were negotiated. The reason for this is that 802.11 employs a contention based mechanism that requires contention for each and every access. It was not specifically designed for mesh networks.

Since each node must contend for the medium before any negotiation packet is transmitted, the total time needed to perform the negotiation is not bounded. The time needed to contend for the medium depends on DIFS and on a contention window size. The RBO is based on the contention window. In this case, it is possible that the negotiation process can exceed the maximum slot time. This leads to an unbounded cycle time and therefore to a delay in delivering delay sensitive packets such as voice.

Existing negotiation methods require many attempts at contending for the medium during a meeting. The methods are not efficient in terms of data transmission and have a low probability of successfully completing the negotiation in the allocated time.

SUMMARY OF THE INVENTION

According to a first aspect of the invention, there is provided a method for use by a network node in a wireless network in which transmission resources are to be allocated for bi-directional communication with a neighbouring network node over a communication medium, the method comprising: transmitting negotiation information to the neighbouring network node; receiving an acknowledgement from the neighbouring network node in response to the transmitted negotiation information; following receipt of the acknowledgement, transmitting data information to the neighbouring node without contending for the communication medium; and following transmission of the data information, receiving negotiation information from the neighbouring network node.

According to an embodiment of the first aspect of the invention, transmitting negotiation information comprises effectively reserving a period of time on the communication medium for a current meeting for the exclusive use of the network node and the neighbouring network node for transmitting negotiation information, receiving an acknowledgement and transmitting data information; and negotiation information further comprises information used to determine a future meeting at a subsequent meeting time between the network node and the neighbouring network node.

According to another embodiment of the first aspect of the invention, following receiving negotiation information from the neighbouring network node, the method further comprises: transmitting an acknowledgement to the neighbouring network node in response to the transmitted negotiation information.

According to another embodiment of the first aspect of the invention, following transmitting an acknowledgement to the neighbouring network node, the method further comprises: receiving data information from the neighbouring network node.

According to another embodiment of the first aspect of the invention, further comprising receiving at least one acknowledgement from the neighbouring network node in response to the transmitted data information.

According to another embodiment of the first aspect of the invention, further comprising transmitting at least one acknowledgement to the neighbouring network node in response to receiving data information from the neighbouring network node.

According to another embodiment of the first aspect of the invention, transmitting negotiation information to a neighbouring network node comprises transmitting at least scheduling information to be used by the neighbouring network node to determine a meeting time.

According to another embodiment of the first aspect of the invention, receiving negotiation information from the neighbouring network node comprises receiving a confirmation for a meeting time and duration for a meeting.

According to another embodiment of the first aspect of the invention, transmitting negotiation information to a neighbouring network node comprises transmitting a negotiation information packet or a packet comprising negotiation information along with data that is non-negotiation information.

According to another embodiment of the first aspect of the invention, further comprising the network node obtaining the communication medium using a contention based mechanism before transmitting negotiation information to the neighbouring network node.

According to another embodiment of the first aspect of the invention, further comprising the network node obtaining the communication medium using a contention free mechanism before transmitting negotiation information to the neighbouring network node.

According to another embodiment of the first aspect of the invention, using the contention based mechanism comprises the network node waiting for a fixed duration of no communication on the communication medium and an additional random duration of no communication before transmitting negotiation information to the neighbouring network node.

According to another embodiment of the first aspect of the invention, using the contention free mechanism comprises the network node waiting for a fixed duration of no communication on the communication medium before transmitting negotiation information to the neighbouring network node.

According to another embodiment of the first aspect of the invention, following transmitting data information to the neighbouring network node the method further comprises: transmitting an indication to the neighbouring network node to initiate transmission of the negotiation information from the neighbouring network node.

According to another embodiment of the first aspect of the invention, a contention based mechanism is Distributed Coordination Function (DCF) as found in IEEE 802.11 or Enhanced Distribution Channel Access (EDCA) protocol as found in IEEE 802.11e.

According to another embodiment of the first aspect of the invention, a contention free mechanism is Point Coordination Function (PCF) as found in IEEE 802.11 or Hybrid Coordination Function Controlled Channel Access (HCCA) protocol as found in IEEE 802.11e.

According to another embodiment of the first aspect of the invention, the network node communicates with more than one neighbouring network node, wherein communicating with all of the more than one neighbouring network nodes a single time collectively comprises a cycle having an allocated cycle time.

According to another embodiment of the first aspect of the invention, transmitting negotiation information to the one or more neighbouring network node is performed less frequently than every cycle.

According to a second aspect of the invention, there is provided a wireless network node comprising: a transit link antenna system; a transit radio connected to the transit link antenna system and configured to communicate with at least one neighbouring network node over transit links using the transit link antenna system; and a communications controller operable to: forward negotiation information to the transit radio for transmission to a neighbouring network node; receive an acknowledgement from the neighbouring network node via the transit radio in response to the transmitted negotiation information; following receipt of the acknowledgement, forward data information to the transit radio for transmission to the neighbouring network node; and following transmission of the data information, receive negotiation information from the neighbouring network node via the transit radio.

According to an embodiment of the second aspect of the invention, the communications controller is further operable to obtain the communication medium for a meeting time by use of a contention based mechanism.

According to another embodiment of the second aspect of the invention, the communications controller is further operable to obtain the communication medium for a meeting time by use of a contention free mechanism.

According to a third aspect of the invention, there is provided a wireless mesh network comprising: a plurality of wireless network nodes each having an access link antenna system and a transit link antenna system, the plurality of wireless network nodes being interconnected with transit links to form a wireless mesh; wherein pairs of neighbouring wireless network nodes, each pair comprising first and second wireless network nodes, communicate during a current meeting duration, and during the current meeting duration: the first and second network nodes are adapted to negotiate a future meeting time and duration that is to occur subsequent to the current meeting duration in a manner that also effectively reserves a communication medium for communication occurring between the first and second network nodes during the current meeting duration, the communication comprising at least transmission of negotiation information used to negotiate the future meeting time and duration and transmission of data information.

According to another aspect of the invention, there is provided a computer readable medium for storing computer programmable code means therein, the computer programmable code means for performing the steps of the methods of the first aspect of the invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In accordance with embodiments of the invention various schemes for negotiating communications between wireless mesh network nodes are described.

According to a broad aspect of the invention, a slot time defining a meeting duration between two neighbouring nodes is divided into at least two portions, namely a downlink transmission portion and an uplink transmission portion. In some embodiments, communication in each transmission portion is bi-directional. That is each node can both send and receive in the downlink or uplink transmission portion. The downlink direction is used in the context of the direction from a network node to a neighbouring network node for an initial negotiation request. The uplink direction is used in the context of the direction from the neighbouring network node to the network node for a negotiation response or confirmation to the initial request. In order to protect packets utilized in the negotiation process from collisions, the negotiation process is combined with the uplink and downlink data information transmissions.

A cycle time is an amount of time that it takes for a network node to have meetings with all of the neighbouring network nodes it communicates with. In some systems in which the invention may be implemented, there are occasions when if the cycle time and meeting duration of each slot time are both fixed then no negotiation is required. This will maximize the number of data information packets that can be transmitted in both uplink and downlink directions. However, when the traffic load is not equally distributed among the nodes or between the uplink and downlink directions, it is advantageous to use a variable, but bounded, meeting duration and cycle time. In some embodiments one or both of the meeting duration and/or cycle time are allocated during the negotiation process. In this case, a negotiation process is required for setting the next meeting time and duration.

If traffic does not change significantly from cycle to cycle then the negotiation process can be performed at a reduced rate. As soon as the volume of traffic or the type of traffic at a given node changes significantly from a previous negotiation, a new negotiation should then be performed. Performing the negotiation only when there are significant changes in traffic will reduce overhead and increase throughput and capacity.

Figure 1:
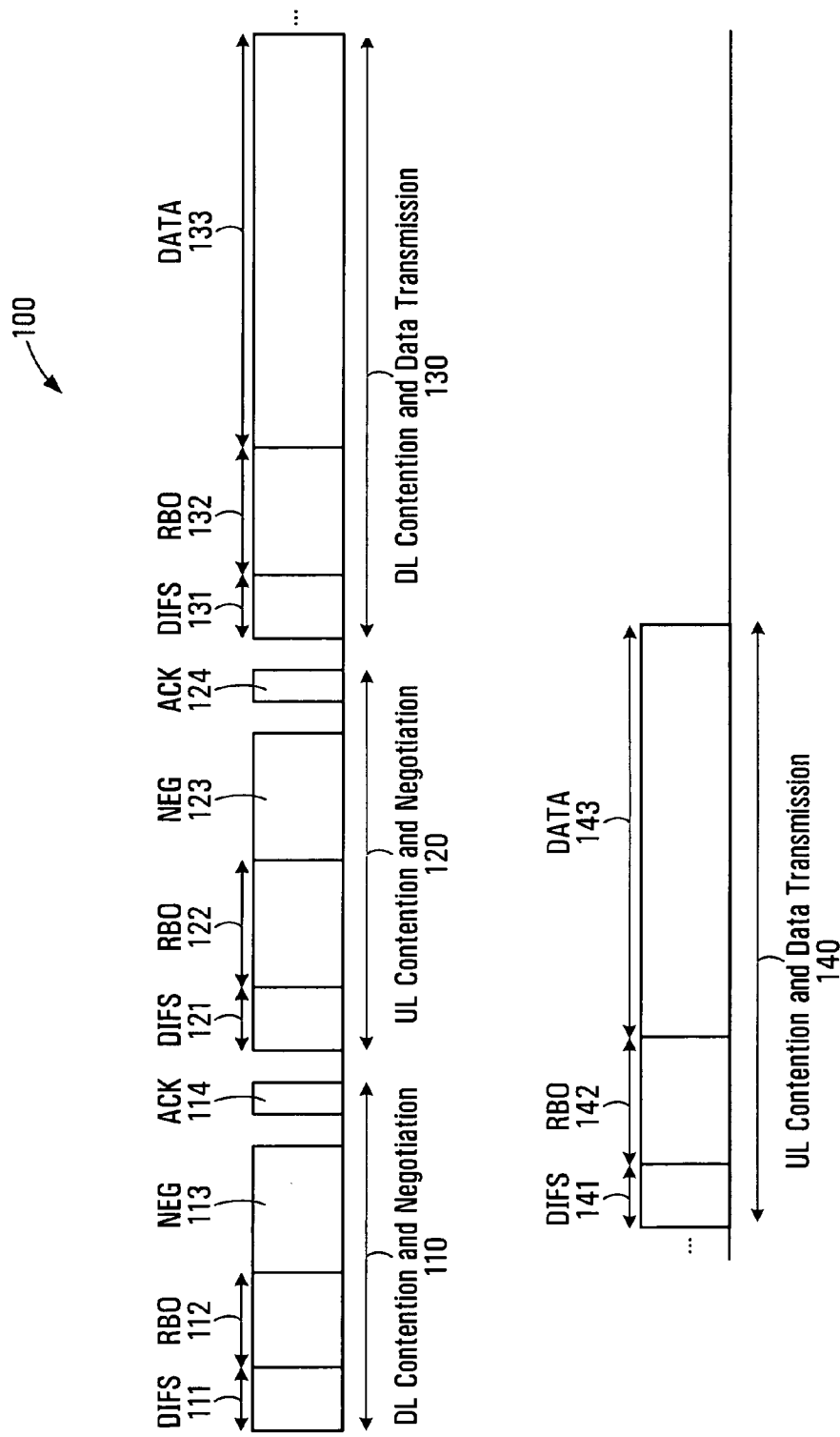
FIG. 1 is a diagram of a known wireless mesh network node negotiation and data communication mechanism for communication between two nodes.
Figure 2:
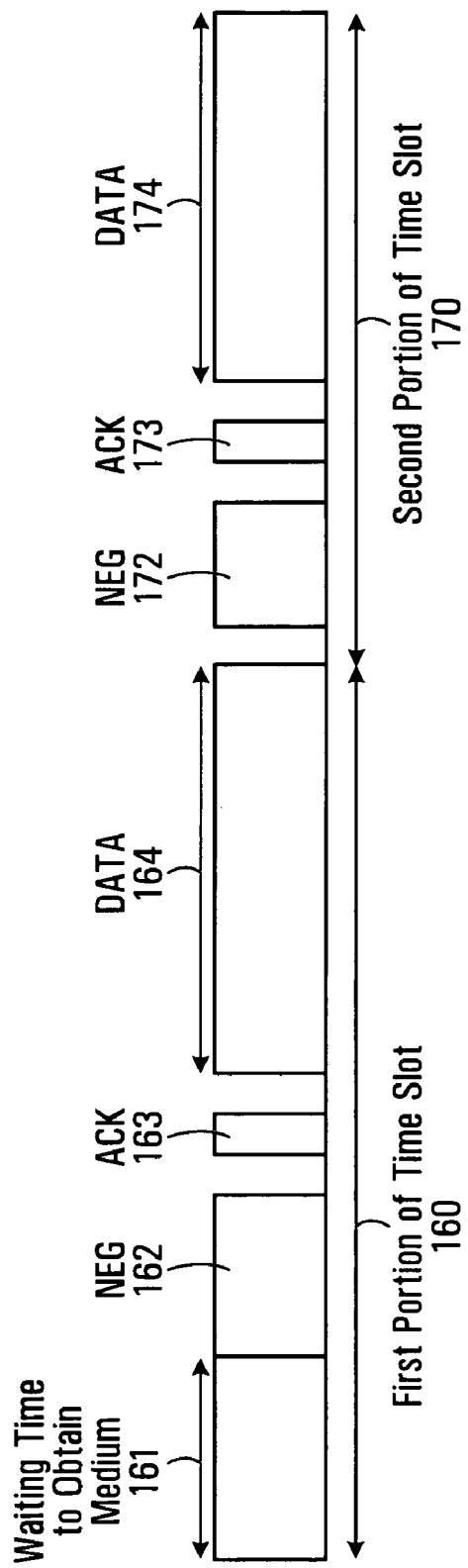
FIG. 2 is a diagram of a wireless mesh network node negotiation and data communication mechanism for communication between two nodes in accordance with a broad aspect of the invention.

FIG. 2 will now be used to describe a broad aspect of the invention with regard to a slot time between a network node and a neighbouring network node. In a first portion of the slot time 160, which is the downlink portion, after a waiting period 161 to ensure that there is no communication occurring on a desired communication medium, the medium is obtained by the network node for a meeting with the neighbouring node. Once the medium is obtained the network node transmits negotiation information 162 to the neighbouring network node. Upon successful receipt of the negotiation information 162, the neighbouring network node transmits an acknowledgement 163 to the network node. Following receipt of the acknowledgement 163, the network node transmits the data information 164 to the neighbouring node. In a second portion of the time slot 170, which is the uplink portion, the neighbouring network node transmits negotiation information 172 to the network node. Upon successful receipt of the negotiation information 172, the network node transmits an acknowledgement 173 to the neighbouring network node. Following receipt of the acknowledgement 173, the neighbouring network node transmits the data information 174 to the network node.

In some embodiments the communication medium represents one or more channels used for transmission of negotiation information and/or data information on the wireless transmit links between nodes.

In the first portion of the time slot 160, the network node sends negotiation information 162 to the neighbouring network node. This might for example include a schedule of when the network node is available to meet with the neighbouring network node. The schedule may include at least one start time for a future meeting between the two nodes and a duration for the future meeting. In some embodiments, the negotiation information 162 includes more than one suggested start time and/or more than one duration. The neighbouring network node determines the time and duration of the next meeting between the two nodes based on the negotiation information 162 sent by the network node in the first portion of the time slot 160. The neighbouring node sends the network node confirmation of the determination in its negotiation information 172 in the second portion of the time slot 170. In some embodiments of the invention, other negotiation information transmitted between the nodes includes a current schedule of other planned transmissions, size of buffers in the nodes used during negotiation and/or data transmission, and/or delay constraints that may affect negotiation and/or data information transmission between the nodes.

In some embodiments of the invention, in the first portion of the slot time 160 the network node contends for the communication medium after the waiting time 161, but before the negotiation process starts. Similarly, in the second portion of the time slot 170 the neighbouring network node also contends for the medium before sending negotiation information 172.

In some embodiments of the invention in the first portion of the slot time 160, the network node does not contend for the communication medium. If after the waiting time 161 no communication is detected, the network node obtains the medium and starts the negotiation process and data transmission. After the network node has finished transmitting data information, the network node sends an indication (not shown) to the neighbouring network node that the neighbouring network node can start the negotiation process and data information transmission. In the second portion of the time slot 170, after receiving the indication from the network node that it is finished transmitting data information, the neighbouring network node does not contend for the communication medium, but sends its negotiation information 172 and subsequently transmits data information 173.

The negotiation process is carried out for two neighbouring nodes in the current slot time of the current cycle time for a meeting time in a slot time for the same two nodes in a subsequent cycle time. In some embodiments, the negotiation process involves effectively reserving the communication medium for a portion of the current slot time for communication between the network node and the neighbouring network node for the exclusive use of the network node and the neighbouring node.

In some embodiments of the invention, a mechanism known as a transmission opportunity (TXOP) is used to protect against the occurrence of packet collisions during negotiation and data transmission for the network node to the neighbouring node. In some embodiments, the TXOP mechanism includes the network node broadcasting information including an amount of time it will be using the medium. The amount of time is sufficient for both sending the negotiation information, receiving an ACK from the neighbouring node and sending data without having to contend for the medium between sending the negotiation information and the data. Neighbouring nodes capable of receiving the broadcast information will detect the broadcast by the network node and will not try to obtain the medium during the time the network node has broadcast it will be using the medium.

The TXOP mechanism is defined in IEEE 802.11e, but more generally any mechanism that allows negotiation information and data information to be transmitted without contending for the medium between the negotiation information and data information so as to avoid packet collision is to be considered within the scope of the invention.

In an example implementation of the TXOP mechanism, a packet duration field that defines a period for which a communication medium will be used for a scheduled meeting between the two node, is set equal to a DL or UL transmission duration that is agreed upon by the negotiation process in the meeting duration for the same two nodes in a previous cycle. The packet duration field is sent to the neighbouring node with which the network node is communicating. In some embodiments, the packet duration field is sent to other neighbouring nodes as well. In some embodiments, the packet duration field is a part of the negotiation information described above. When the other neighbouring nodes read the packet duration field of the network node, know they should not occupy the medium for that time. In 802.11e they might update their network allocation vector (NAV) with information included in the packet duration field. The NAV is used within IEEE 802.11 networks to prevent node accessing the communication medium and causing contention. The NAV is an indicator, maintained by each node, of time periods when transmission will not be initiated even though there may not be an indication that the communication medium is being used.

Therefore, the other neighbouring nodes that are able to read the packet duration field know when and how long the communication medium will be busy and will not attempt to transmit during this time. Nodes that do not detect the packet duration field sent by the network node may not be aware of the fact that a meeting is scheduled to occur. These nodes may also contend for the communication medium at the same time as the nodes that are schedule to have the meeting. Examples of such nodes that detect the packet duration field are nodes in an area of the network that are temporarily or permanently obscured from receiving transmission or are a substantial distance from the network node, or nodes configured in a manner than they are not capable of receiving the packet duration information.

The TXOP mechanism can be used in conjunction with either a contention based mechanism or a contention free mechanism for first obtaining the communication medium. In the IEEE 802.11e standard an example of a contention based mechanism is Enhanced Distribution Channel Access (EDCA) TXOP. An example of a contention free mechanism in the same standard is Hybrid Coordination Function (HCF) Controlled Channel Access (HCCA) TXOP.

More generally, it is to be understood that other types of contention based and/or contention free mechanisms can be used for negotiating communications between nodes. For example, in IEEE 802.11, a contention based mechanism is distributed coordination function (DCF) and a contention free mechanism is point coordination function (PCF).

The time slot is separated into two transmission opportunities, a downlink TXOP and an uplink TXOP. If a contention based transmission opportunity is used, such as the EDCA TXOP described in the IEEE 802.11e standard or DCF in the IEEE 802.11 standard, then for each uplink and downlink transmission opportunity the network node contends for the medium only once, rather than multiple times such as at least before each of sending negotiation information and sending data transmission. If a contention free transmission opportunity is used, such as the HCCA TXOP described in the IEEE 802.11e standard or PCF in the IEEE 802.11 standard, contention is not used to determine which node will initiate the negotiation process. A first node of the two nodes is selected to be the node to initiate negotiation and data transmission. After it has obtained the medium, it sends negotiation information and data information. The first node then notifies the other node to begin sending its negotiation information and data information to the first node.

Figure 3:
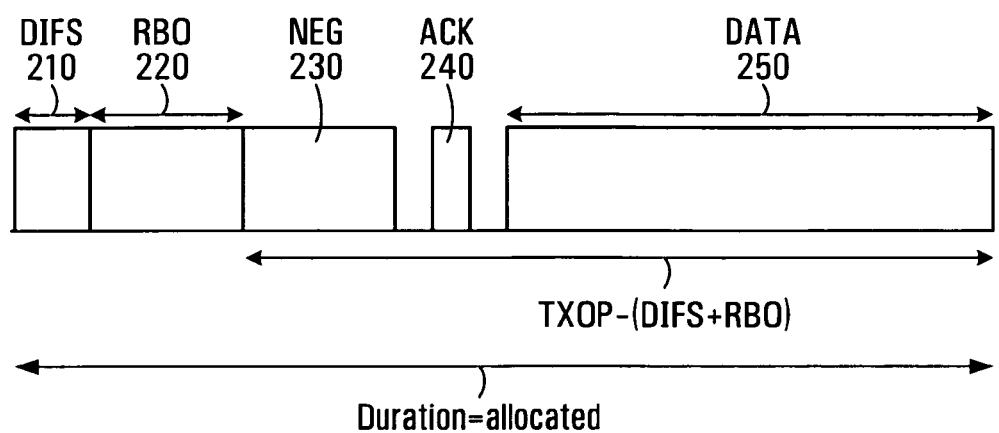
FIG. 3 is a diagram of a wireless mesh network node negotiation and data communication mechanism using Enhanced Distribution Channel Access (EDCA) protocol for communication between two nodes in accordance with an embodiment of the invention.

FIG. 3 will now be used to describe a specific example of contention, negotiation and data transmission in one direction between two nodes according to the EDCA TXOP. Contention, negotiation and data transmission all occur within an allocated time agreed upon by the negotiation process in the meeting duration for the same two nodes in a previous cycle. A contention portion includes a fixed waiting period equal to DCF Interframe Space (DIFS) 210 and a random waiting duration equal to random backoff (RBO) 220. The use of a RBO mechanism is considered to be well known in the art and will not be described in further detail. A negotiation portion includes a negotiation information packet 230 sent by a first node to a second node and an ACK 240 sent by the second node back to the first node. Data 250 is the transmitted from the first node to the second node following the successful achieved negotiation portion.

In order to keep the cycle time bounded, the TXOP duration is set equal to the DL/UL transmission duration reduced by an amount equal to the contention portion used to acquire the medium, for example, DIFS 210 plus RBO 220.

In a transmission opportunity, the first packet in the TXOP will be either a separate negotiation request packet or a negotiation request packet piggybacked onto a data packet.

A single time slot with communication between a first node and a second node in both the DL and UL directions will now be described with regard to FIG. 4. A DL contention and data transmission portion 310 contains the same various elements described in FIG. 3 of a contention portion equal to DIFS 311 plus RBO 312, a negotiation information packet (NEG) 313, an acknowledge (ACK) 314 and data 315 to be transmitted between the nodes. In combination, the NEG 313, ACK 314 and data 315 form a DL transmission opportunity 316 (DL TXOP). In the DL TXOP 316, the NEG 313 is sent by the first node to the second node and the ACK 314 by the second node to the first node. Following the received ACK 314, the data 315 is sent from the first node to the second node in the down link direction.

A UL contention and data transmission portion 320 of the communication between the nodes includes waiting periods DIFS 321 and RBO 322 and contains an uplink transmission opportunity 326 (UL TXOP). The UL TXOP 326 includes a negotiation information packet (NEG) 323 sent by the second node to the first node, an ACK 324 sent from the first node to the second node, and data 325 sent from the second node to the first node in the up link direction.

Figure 4:
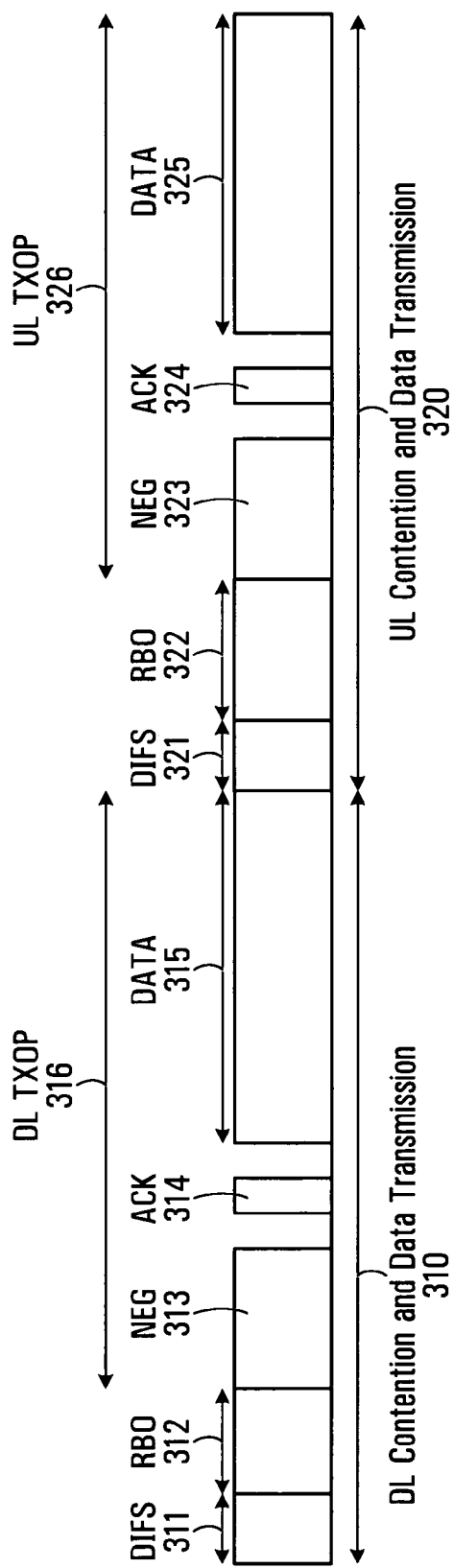
FIG. 4 is a diagram of a wireless mesh network node negotiation and data communication mechanism for downlink (DL) and uplink (UL) communication for a slot time using EDCA protocol in accordance with an embodiment of the invention.
Figure 5:
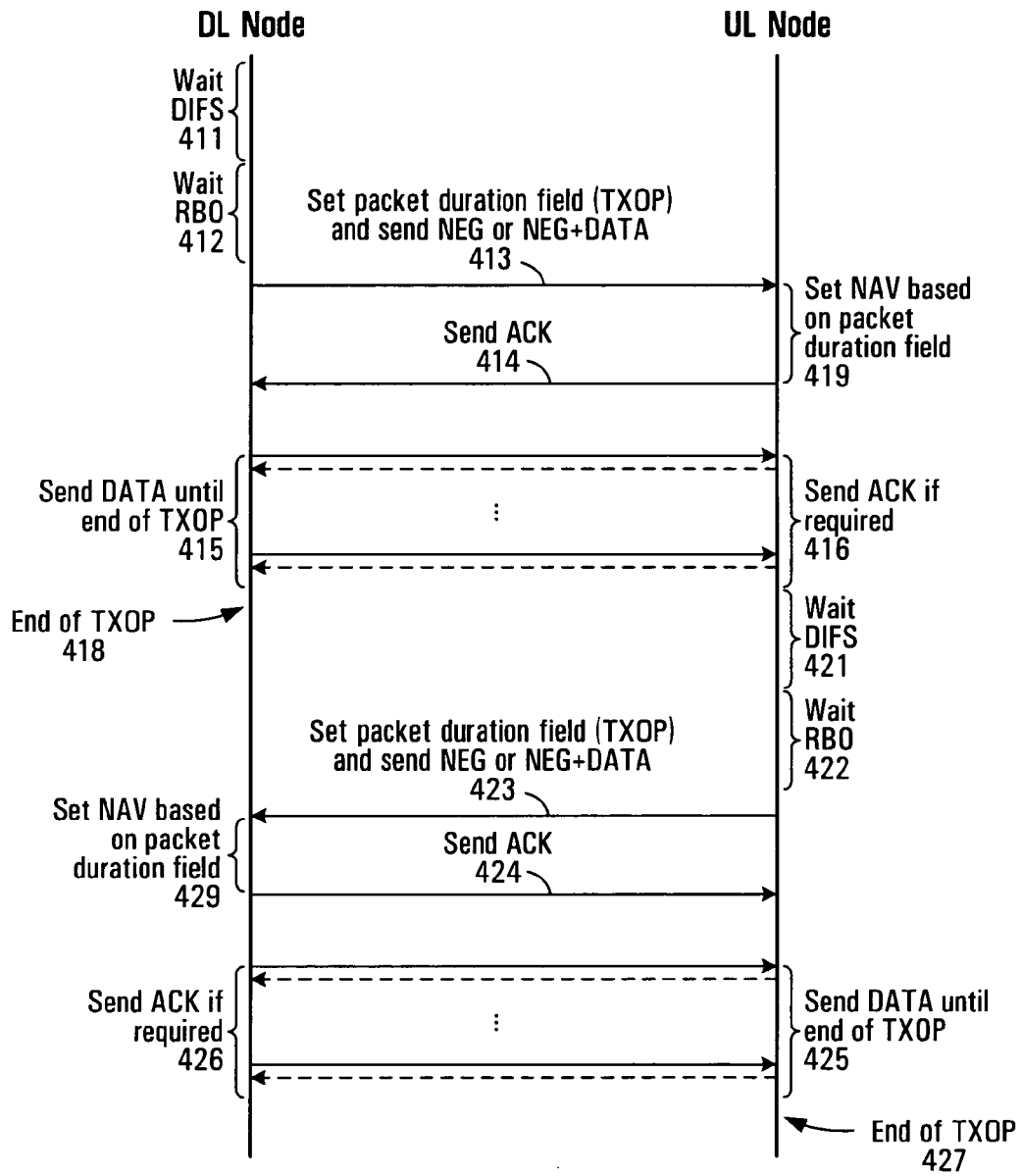
FIG. 5 is a signaling diagram of a wireless mesh network node DL and UL communication mechanism for the slot time of FIG. 3 using EDCA protocol in accordance with an embodiment of the invention.

The timing diagram of FIG. 5 will now be used to further describe the example of FIG. 4. The first node, identified as a DL node waits 411 for a silent fixed duration of no communication on the communication medium equal to DIFS and then waits 412 a random duration equal to RBO. Following this, the DL node sets the packet duration field within the negotiation information packet with respect to the duration of the DL TXOP and sends 413 the negotiation information packet. In some embodiments setting the packet duration field is setting a duration of use of the communication medium equal to that which the DL node will use for transmitting negotiation information and data information to a neighbouring node, identified as a UL node. In some embodiments the negotiation information packet may also include data that is unrelated to the negotiation information. In response to receiving the negotiation information packet, the UL node uses information in the negotiation information packet, such as previously confirmed meeting start time and duration information in setting 419 its NAV. The UL node then sends 414 an ACK to the DL node. It is at this point that in some embodiments other neighbouring nodes that are capable of detecting the packet duration field also set their respective NAVs. Having received the ACK, the DL node initiates sending 415 data until the end of the duration of the TXOP. In some embodiments the data is sent in packets where upon receipt of each packet the UL node sends 416 an ACK to the DL node. In some embodiments, an ACK is only sent by the UL node after the last packet is sent. In some embodiments, the UL node does not send any ACK to the DL node during the duration of the DL TXOP. However, if one or more ACKs are sent by the UL node, the last ACK is to be received before the end 418 of the DL TXOP.

After the DL TXOP duration has ended, the UL node must contend for the medium. Therefore, the UL node waits 421 for a silent duration equal to the DIFS and then waits 422 a duration equal to the RBO. The UL node then sets the packet duration field for the UL TXOP and sends 423 the negotiation information packet or negotiation information packet with non-negotiation information data. In response to receiving the negotiation information packet, the DL node uses information in the negotiation information packet in setting 429 its NAV. The DL node then sends 424 an ACK to the UL node. After the ACK has been received, the UL node sends 425 data to the DL node until the end of the duration of the UL TXOP allocated in the packet duration field by the UL node. During transmission of data in the UL TXOP, ACKs may or may not be used to acknowledge data sent from the UL node to the DL node, but if they are used, the last ACK must be received before the end 427 of the UL TXOP. Following the end 427 of the UL TXOP, another slot time may begin for communication of the network node and another neighbouring node.

In either of the DL or UL contention and data transmission portions 310, 320, once the negotiation information packet requesting negotiation is transmitted, an ACK is received from the other node after a time equal to a Short Interframe Spacing (SIFS). Once the negotiation request is appropriately acknowledged, after another time interval equal to SIFS, data is be transmitted. If no acknowledge is received, the negotiation request is retransmitted up to a retransmission limit. In some embodiments the retransmission limit may be defined in terms of a number of allowed retransmits or a particular period of time. If after an attempted number of retransmits the negotiation request packet is still unsuccessful in being acknowledged by the neighbouring node when the scheduled meeting time duration comes to an end, the negotiation request will continue to be retransmitted in the next cycle.

SIFS is set to be a shorter duration than DIFS. Therefore, as a SIFS waiting period expires before a DIFS period, a node should avoid starting contention while the medium is being used, but initially appears to be free because communicating nodes are waiting for an ACK or to send data.

In some embodiments, if communication is detected on the communication medium during the DIFS duration, the node waits a particular period of time and begins the DIFS waiting period again. In other embodiments, the node begins the DIFS waiting period as soon as the medium is detected to be silent again.

FIG. 5 illustrates an example where the DL node has successfully contended for the medium first and therefore transmits its data first. If the UL node had successfully contended for the medium first, then the process would be similar, except that the directionality of communication would be reversed. More generally, the node that successfully contends for the medium first is the node that negotiates and sends data first.

If a contention free transmission opportunity is used, such as the HCCA TXOP described in the 802.11e standard, the overhead associated with obtaining the medium is reduced further. In this case, each node has one polling list for each of its neighbours. For each meeting of a network node and it's associated neighbour there is only one neighbour to poll at that time, so the network node's polling list includes only the associated neighbour.

In a contention free transmission opportunity the node that obtains the communication medium after a silent fixed waiting time in which no traffic is detected on the medium is designated as a hybrid coordinator (HC). In HCCA the silent fixed waiting time is identified as PCF Interframe Spacing (PIFS).

Figure 6:
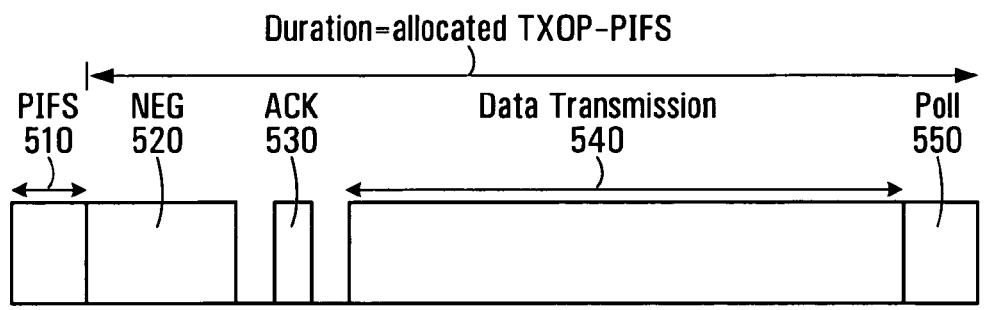
FIG. 6 is a diagram of a wireless mesh network node communication mechanism using Hybrid Coordination Function Controlled Channel Access (HCCA) protocol for communication between two nodes in accordance with an embodiment of the invention.

FIG. 6 will now be used to describe a specific example of contention free, negotiation and data transmission in one direction between two nodes according to HCCA TXOP. Negotiation and data transmission all occur within an allocated time agreed upon by the negotiation information packets in the time slot for the same nodes in a previous cycle. Once the HC obtains the medium, the allocated time for HC negotiation and data transmission is reduced by the fixed waiting time equal to PIFS 510. A negotiation portion includes a negotiation information packet 520 sent by the HC to a node the HC is communicating with and an ACK 530 is sent by the node the HC is communicating with back to the HC. Data 540 is then transmitted from the HC to the node the HC is communicating with following the successful negotiation portion. At the end of the data transmission, the HC sends an indication, for example in the form of a poll 550 to the node it is communicating with to initiate negotiation and data transmission in the reverse direction.

Figure 7:
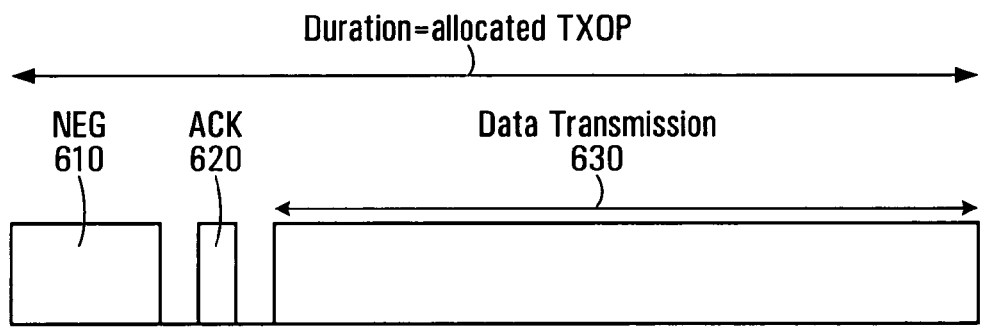
FIG. 7 is a diagram of a wireless mesh network node communication mechanism using HCCA protocol for communication between two nodes in accordance with an embodiment of the invention.

FIG. 7 will now be used to describe an example of contention free negotiation and data transmission from the non-HC node to the HC after the poll has been received from the HC. Negotiation and data transmission occur within an allocated duration agreed upon by the negotiation information packets in the time slot for the same nodes in a previous cycle. Once the poll has been received and the non-HC node obtains the medium, negotiation occurs. A negotiation portion includes a negotiation information packet 610 sent by the non-HC node to the HC and an ACK 620 sent by the non-HC node to the HC. Data 630 is then transmitted from the non-HC node to the HC.

As with the EDCA TXOP, the negotiation portion can be either a negotiation information packet or a negotiation information packet piggy-backed onto a data packet. In some embodiments, during the current meeting, one of the nodes is designated as the HC for the next meeting. The HC can be designated during the negotiation process or at the end of the data transmission. One example of a mechanism used to determine which node will be the HC for a given slot time is priority of communications that occur between the nodes. Another example is alternating the HC designation between the two neighbouring nodes. However, determining which node is the HC is considered to be an implementation specific task that is not to be limited to only the two described examples.

Figure 8:
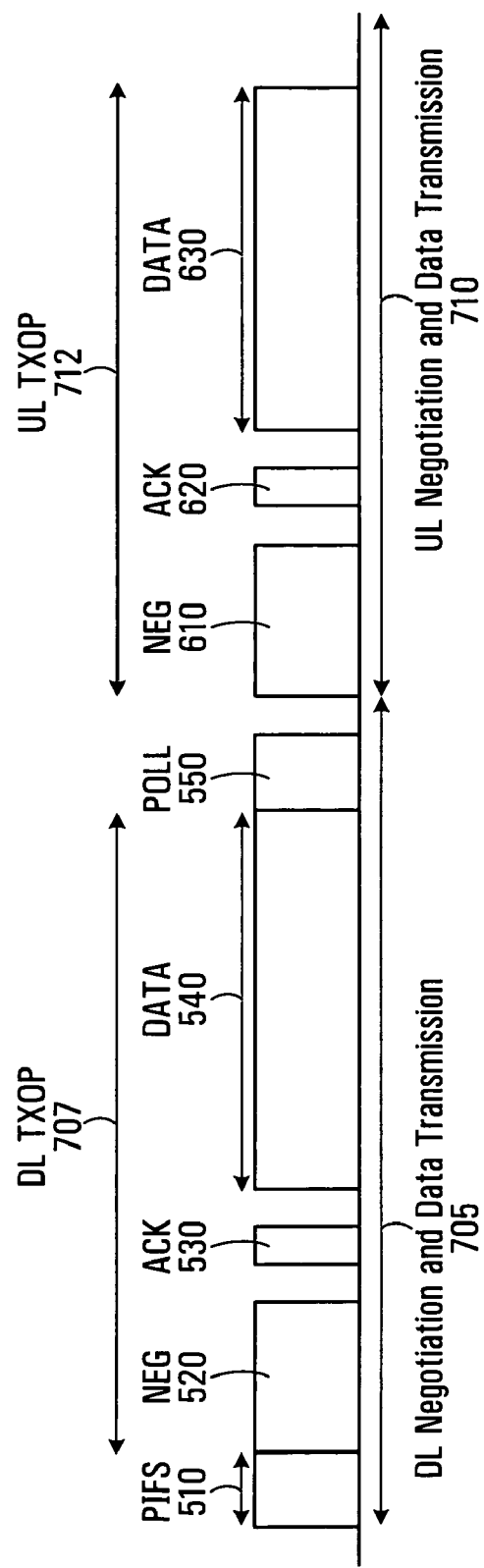
FIG. 8 is a diagram of a wireless mesh network node negotiation and data communication mechanism for DL and UL communication for a slot time using HCCA protocol in accordance with an embodiment of the invention.

FIG. 8 shows an example of negotiation for an entire time slot in which the HC to non-HC direction of communication of FIG. 6 is a DL Negotiation and Data Transmission portion 705 and non-HC to HC direction of communication of FIG. 7 is a UL Negotiation and Data Transmission portion 710.

Figure 9:
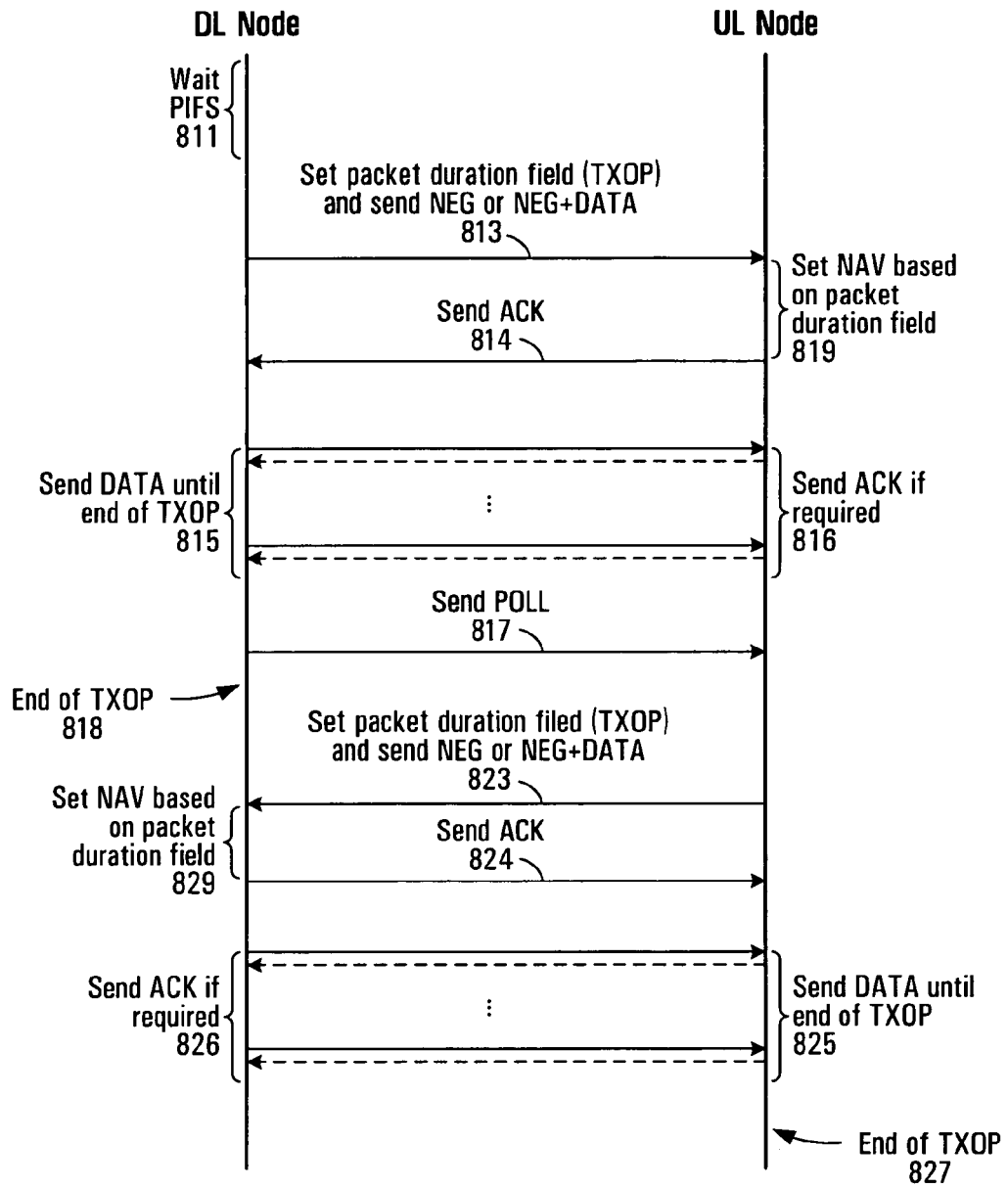
FIG. 9 is a signaling diagram of wireless mesh network node DL and UL communications for the slot time of FIG. 8 using HCCA protocol in accordance with an embodiment of the invention.

FIG. 9 shows a timing diagram for communication between the DL node and the UL node. The timing diagram is similar to that of FIG. 5, except that instead of waiting for DIFS 411 and RBO 411, the initial waiting duration is equal to PIFS 811. Steps 813, 819, 814, 815, 816 correspond to steps 413, 419, 414, 415, 416 of FIG. 5. Prior to the end 818 of DL TXOP, the HC DL node sends 817 the poll to the UL node. The UL node does not have to contend for the medium and as a result does not have to wait for a duration equal to the DIFS and RBO, but sets the NAV and sends 823 the negotiation portion. Steps 819, 824, 825, 826 and 827 correspond to steps 419, 424, 425, 426 and 427 of FIG. 5.

The fixed waiting periods DIFS, PIFS, and SIFS are described as being of a fixed duration. However, while these values are fixed, as opposed to the random duration used in the RBO mechanism, it is to be understood that the fixed duration can be varied in duration according to the application. The duration of the respective DIFS, PIFS, and SIFS waiting periods, as well as a range of the duration of the RBO mechanism are all considered to be implementation specific.

For purposes of providing support and context for the negotiation schemes described above FIGS. 10 and 11 describe a wireless communication network and wireless network node respectively in accordance with an embodiment of the invention.

Figure 10:
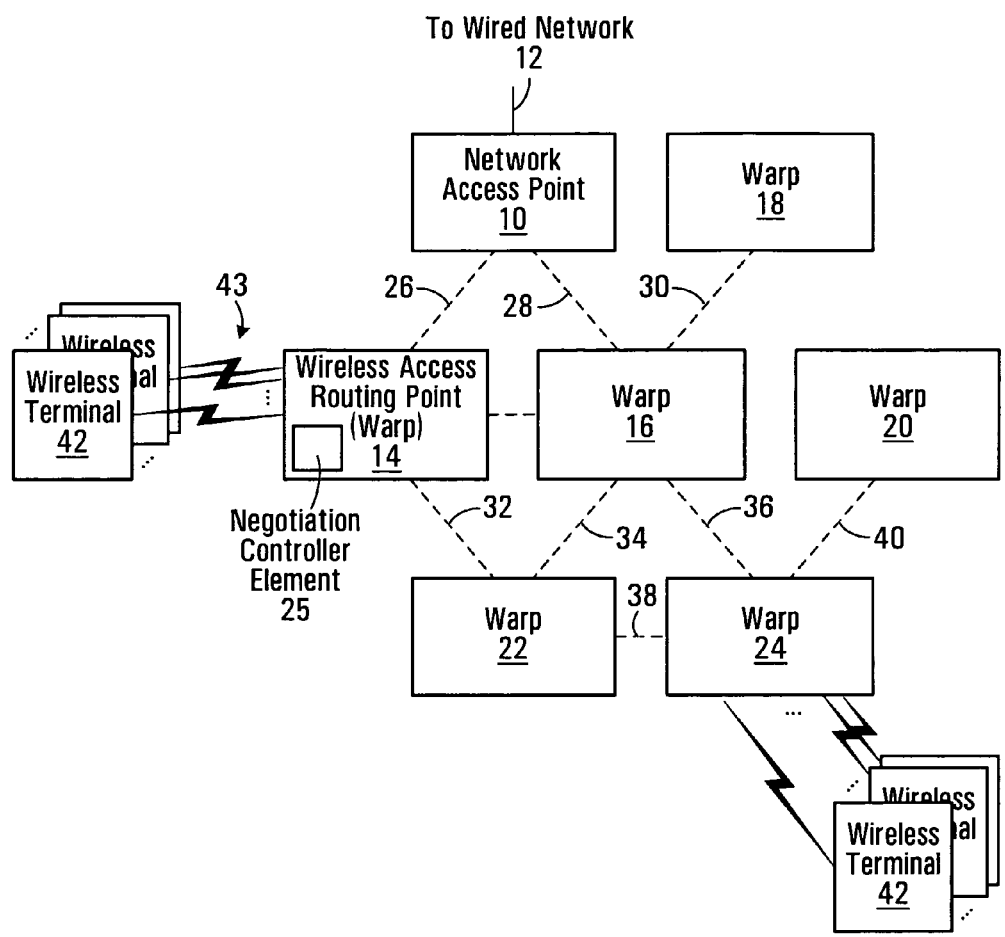
FIG. 10 is a block diagram of a distributed wireless communication network in accordance with an embodiment of the invention.

FIG. 10 is a block diagram of a distributed wireless communication network, in which the present invention may be implemented. The wireless communication network has a plurality of wireless access routing points (WARPs) 14, 16, 18, 20, 22, and 24 that are distributed about a region to be covered, and a plurality of wireless transit links 26, 28, 30, 31, 32, 34, 36, 38, and 40 that interconnect the WARPs. The WARPs and transit links collectively constitute a wireless mesh network that provides a wireless mesh transport for traffic to and from wireless terminals accessing the network. Several such wireless terminals are indicated at 42 communicating with WARPs over access links 43.

While a wireless mesh network is specifically referred to above, it is to be understood that the invention more generally applies to a wireless network wherein multiple network nodes communicate with one another via transmit communication links. A further example of such a wireless network is a tree network.

In the event the network is to be connected externally, typically the case, one or more NAPs (network access points) 10 are provided for connection to external networks over connection 12. An example of such an external network is a wired backbone network such as the Internet. Connection 12 is typically a broadband wireline connection but other implementations are possible.

Each of the WARPs 14-24 features a negotiation controller element 25 although this is only shown in WARP 14 in the drawing for simplification. The negotiation controller element 25 controls negotiation between the WARPs 14-24. In some embodiments functionality for controlling contention between the WARPs 14-24 is also included in the negotiation controller element. In some embodiments functionality for controlling data transmission following successful negotiation between the WARPs 14-24 is also included in the negotiation controller element. The negotiation controller element 25 can be implemented using any suitable one or combination of hardware, software, firmware, etc.

The network shown in FIG. 10 is a particular example of the type of communication network to which the present invention is applicable. The invention is in no way restricted to the particular network of FIG. 10, and may be implemented in other types of networks having different numbers and types of network nodes, for instance.

In operation, the communication network shown in FIG. 10 enables subscribers with suitable wireless terminals to receive various services by accessing the network. Preferably, each of the WARPs supports both network access and transit functionality. In other embodiments, a set of wireless network nodes is provided each of which supports either both network and transit functionality or only transit functionality (i.e. some dedicated transit nodes). In yet further embodiments, dedicated access nodes are provided that provide access functionality only. Access and transit functionality is co-located in each WARP in FIG. 10, and in the description that follows, the assumption is made that each WARP supports both access and transit functionality.

Access capabilities are preferably afforded by the provision of one or more antennas for communication with wireless terminals of a variety of different types. These might include for example wireless personal digital assistants (PDAs), personal computers, and hybrid telephony-data terminals. In other implementations, these antennas are in the form of omni-directional antennas or arrays of directional antennas arranged to provide up to 360 degree coverage. Two or more access antennas are often provided at each node for diversity purposes. Whereas omni-directional antennas typically provide broader coverage with a single antenna element, directional antennas or arrays tend to have higher gain and can provide a more focused access coverage area if desired.

Transit capabilities can be enabled using an array of directional antennas that provide for directional communication with other network nodes or, for example, wireless backhaul. An antenna array may comprise as few as two antenna elements, although arrays of six or more antennas are more common to afford a reasonable degree of directional association for each antenna. As those skilled in the art will appreciate, the number of antenna elements required to provide a full 360 degrees of transit link coverage for a network node increases with the directionality of the antenna elements in the array antenna at that node. That is, the more directional the antenna elements in the array, the greater the number of elements required to provide 360 degree coverage. The antenna elements of a directional array are also preferably arranged to include diversity, in the form of space or polarization diversity. Polarization diversity has the advantage that a more compact array may be implemented.

In operation, each wireless terminal 42 communicates directly with one of the WARPs (and possibly the NAP 10 where the NAP 10 also supports access functionality), typically but not necessarily the WARP that is physically the nearest to the particular wireless terminal. The WARP providing access capability for a given communication will be referred to as the "source node". Communication between the wireless terminal and the source node uses an access radio in the source node. The WARPs 14-24 route traffic throughout the network, and possibly outside the network through the NAP 10, via transit links 26-40. Traffic is also forwarded, as necessary, between the WARPs 14-24 to reach wireless terminals within the network.

Communication over the transit links is preferably coordinated such that each transit link beam at a network node is aligned with neighbouring network nodes. Example methods of transit link coordination are taught in commonly assigned U.S. patent application Ser. Nos. 11/239,336 filed Sep. 30, 2005 entitled "Method of Scheduling with Multiple Radios Per Node in a Wireless Multihop Network" and 10/682,089 filed Oct. 10, 2003 entitled "Transit Link Coordination Systems And Methods For A Distributed Wireless Communication Network", hereby incorporated by reference in their entirety. More generally, any appropriate mechanism for handling the traffic on the wireless mesh can be implemented.

One approach to transit link coordination, also described briefly above, is to synchronize network nodes. However, synchronous techniques have several inherent drawbacks. Establishing and maintaining synchronization between nodes is difficult in packet data systems or other communications systems with bursty or otherwise irregular traffic. In a packet radio system, for example, there is no continuous transmission between network nodes, and hence no continuous coordination of clocks is possible. Also, there tends to be significant jitter in transmission times because delays for the packet transmission are unknown, thus making it difficult for a receiver to establish timing by listening to its neighbours. Synchronization in this environment is not impossible, but is technically complex and typically very expensive. Usually, in a system for synchronization where the links are affected by jitter, a very stable, and consequently expensive, local oscillator is needed at each node to filter out the effects of the jitter in synchronization signals. Such systems also take time to come into synchronization. The time synchronization is thus difficult to achieve and maintain to the degree of accuracy necessary for optimal system performance.

The required synchronization accuracy amounts to a small but finite fraction of the time it takes to send a packet between network nodes. For a 2 Kbyte packet using a 20 Mbit/s radio throughput rate, for example, the packet transmission time is on the order of about 900 microseconds. However, jitter on the available transmission can be on the order of several microseconds, due to 802.11 MAC protocols and channel sensing, for instance.

Thus, jitter can be a significant fraction of the packet transmission time, and as such any allowance in the timeslots for jitter significantly reduces efficiency. In addition, relatively small time slots, about 0.5 milliseconds for the above example throughput rate, are desirable to avoid waste if a packet does not fill the slot, but difficult to achieve with uncoordinated network nodes.

Link capacity reallocation also remains a challenge with fixed length or synchronized time slots.

Transit link coordination techniques according to aspects of the invention provide for alignment of transit link beams between neighbouring network nodes, and scheduled contact or rendezvous between network nodes. Scheduled node contact provides for exchange of traffic having quality of service (QoS) requirements without a need to introduce a fully synchronous operation. Where contact between network nodes is scheduled and thus expected, loss of a network node is detected much more quickly than in known asynchronous networks. Distributed implementation of transit link coordination at each network node as described below also avoids any requirement for a central network coordination manager for transit link coordination in an asynchronous system.

Figure 11:
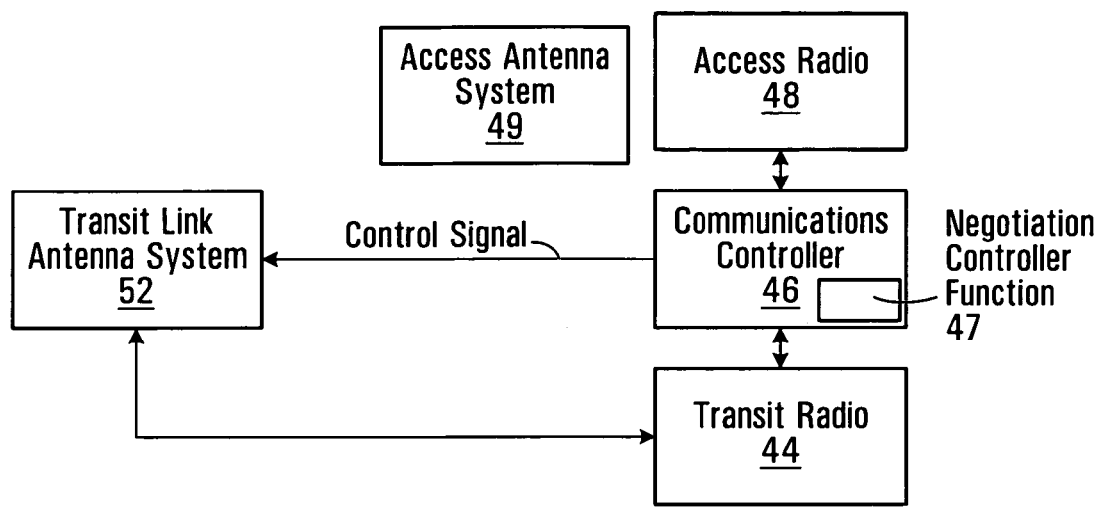
FIG. 11 is a block diagram of a wireless access routing point (WARP) in accordance with an embodiment of the invention.

FIG. 11 is a block diagram of a WARP in accordance with an embodiment of the invention. Each of the WARPs 14-24 of 10 preferably has a similar structure to the WARP shown in FIG. 11, but other implementations are possible. The WARP in FIG. 11 has an access radio 48 connected to an access antenna system 49. There is a communications controller 46 connected to the access radio 48, a transit radio 44, and a transit antenna system 52 that is also connected to the transit radio 44. A WARP may also include further components that have not been shown in FIG. 11 to avoid congestion in the drawing. Furthermore, while a very specific set of interconnections between the various components of FIG. 11 has been shown, it is to be understood that components may be interconnected differently, or a smaller number of interconnections/components implemented with one or more functions combined.

The communications controller 46 has a negotiation controller function 47. The negotiation controller function 47 controls negotiation between the WARPs 14-24. In some embodiments functionality for controlling contention between the WARPs 14-24 is also included in the negotiation controller function 47. In some embodiments functionality for controlling data transmission following successful negotiation between the WARPs 14-24 is also included in the negotiation controller function 47. The negotiation controller function 47 can be implemented using any suitable one or combination of hardware, software, firmware, etc. While in the illustrated example, the negotiation controller 47 is shown implemented as part of the communications controller 46, it can alternatively be implemented as part of one of the other components illustrated or as a separate component.

The access radio 48 and the access antenna system 49 support a network access function for wireless terminals (not shown) located within an access coverage area of the WARP. The access radio 48 performs such operations as communication signal frequency conversion, filtering, encoding and decoding, and modulation and demodulation, for example. The access antenna system 49 transmits communication signals to and receives communication signals from wireless terminals, and comprises either a single antenna element or multiple antenna elements such as main and diversity antenna elements. The access antenna system may for example include space and/or polarization diversity.

The operation of the communications controller 46 is dependent upon the design and configuration of the WARP. Generally, a communications controller handles such control functions as routing of communication signals between the transit radio 44 and the access radio 48 and control of scanning operations by the transit radio 44 and the access radio 48. In one example embodiment, the communications controller 46 receives packets from the access radio 48, stores them briefly in suitable memory if needed, determines an appropriate transit radio link for a destination or a next hop in a path to a destination, and forwards the packets through the selected transit radio link via the transit radio 44.

The communications controller 46 also determines an appropriate one of a plurality of transit link operating modes and provides a control signal to the transit link antenna system 52. The transit radio 44 performs operations similar to those of the access radio 48, to support transit links to one or more other WARPs. The access radio 48 and the transit radio 44 typically employ different frequency bands, and possibly different encoding and modulation schemes. For example, in one embodiment, the access radio 48 is an 802.11b/g module operating at 2.4 GHz, whereas the transit radio 44 is an 802.11a module operating in the 5.15 and 5.85 GHz bands. It is to be appreciated, however, that the present invention is applicable to other sets of frequencies for one or both the access and transit functions and to other radio system standards, such as IEEE 802.16a.

The transit link antenna system 52 transmits and receives communication signals over wireless transit links. In order to mitigate co-channel interference arising from multiple simultaneous transmissions over several transit links, directional antennas are preferably employed in the transit link antenna system 52 for the transit radio links. Directional antennas provide two useful properties: increased gain, which provides greater range, and directional azimuth and elevation beam patterning, which provides attenuation to unwanted co-channel and adjacent channel interferers.

While the above examples are described with respect to mesh networks, it is to be understood that the invention is not limited to this application. For example, the invention can be implemented with a hierarchical tree type network as well.

Numerous modifications and variations of the present invention are possible in light of the above teachings. It is therefore to be understood that within the scope of the appended claims, the invention may be practised otherwise than as specifically described herein.

The invention claimed is:

1. A method for use by a network node in a wireless network in which transmission resources are to be allocated for bi-directional communication with a neighbouring network node over a communication medium, the method comprising:
   transmitting negotiation information to the neighbouring network node;
   receiving an acknowledgement from the neighbouring network node in response to the transmitted negotiation information;
   following receipt of the acknowledgement, transmitting data information to the neighbouring node without contending for the communication medium; and
   following transmission of the data information, receiving negotiation information from the neighbouring network node;
   wherein the transmitted and received negotiation information comprises information for establishing a future meeting at a subsequent meeting time between the network node and the neighbouring network node.

2. The method of claim 1, wherein:
   transmitting negotiation information comprises effectively reserving a period of time on the communication medium for a current meeting for the exclusive use of the network node and the neighbouring network node for transmitting negotiation information, receiving an acknowledgement and transmitting data information.

3. The method of claim 1, wherein following receiving negotiation information from the neighbouring network node, the method further comprises:
   transmitting an acknowledgement to the neighbouring network node in response to transmitting negotiation information.

4. The method of claim 3, wherein following transmitting an acknowledgement to the neighbouring network node, the method further comprises:
   receiving data information from the neighbouring network node.

5. The method of claim 4, further comprising transmitting at least one acknowledgement to the neighbouring network node in response to receiving data information from the neighbouring network node.

6. The method of claim 1, further comprising receiving at least one acknowledgement from the neighbouring network node in response to transmitting data information.

7. The method of claim 1, wherein transmitting negotiation information to a neighbouring network node comprises transmitting at least scheduling information to be used by the neighbouring network node to determine a meeting time.

8. The method of claim 1, wherein receiving negotiation information from the neighbouring network node comprises receiving a confirmation for a meeting time and duration for a meeting.

9. The method of claim 1, wherein transmitting negotiation information to a neighbouring network node comprises transmitting a negotiation information packet or a packet comprising negotiation information along with data information that is non-negotiation information.

10. The method of claim 1 further comprising the network node obtaining the communication medium using a contention based mechanism before transmitting negotiation information to the neighbouring network node.

11. The method of claim 10, wherein using the contention based mechanism comprises the network node waiting for a fixed duration of no communication on the communication medium and an additional random duration of no communication before transmitting negotiation information to the neighbouring network node.

12. The method of claim 1 further comprising the network node obtaining the communication medium using a contention free mechanism before transmitting negotiation information to the neighbouring network node.

13. The method of claim 12, wherein using the contention free mechanism comprises the network node waiting for a fixed duration of no communication on the communication medium before transmitting negotiation information to the neighbouring network node.

14. The method of claim 1, wherein following transmitting data information to the neighbouring network node the method further comprises:
  transmitting an indication to the neighbouring network node to initiate transmission of the negotiation information from the neighbouring network node.

15. The method of claim 1 further comprising the network node communicating with more than one neighbouring network node, wherein communicating with all of the more than one neighbouring network nodes a single time collectively comprises a cycle having an allocated cycle time;
  wherein transmitting negotiation information to the one or more neighbouring network node is performed less frequently than every cycle.

16. A computer readable medium for storing computer programmable code means thereon for execution by a processor, the computer programmable code means for performing the steps of the method of claim 1.

17. The method of claim 1 wherein negotiation information further comprises one or more of:

a) a current schedule of other planned transmissions;
b) a size of buffers in the nodes used during at least one of negotiation and data transmission; and
c) delay constraints affecting at least one of negotiation and data transmission.

18. A wireless mesh network comprising:
a plurality of wireless network nodes each having an access link antenna system and a transit link antenna system, the plurality of wireless network nodes being interconnected with transit links to form a wireless mesh;
wherein pairs of neighbouring wireless network nodes, each pair comprising first and second wireless network nodes, communicate during a current meeting duration, and during the current meeting duration:
the first and second network nodes are adapted to negotiate a future meeting time and duration that is to occur subsequent to the current meeting duration in a manner that also effectively reserves a communication medium for communication occurring between the first and second network nodes during the current meeting duration, the communication comprising at least transmission of negotiation information used to negotiate the future meeting time and duration and transmission of data information.

19. A wireless network node comprising:
a transit link antenna system;
a transit radio connected to the transit link antenna system and configured to communicate with at least one neighbouring network node over transit links using the transit link antenna system; and
a communications controller operable to:
  forward negotiation information to the transit radio for transmission to a neighbouring network node;
  receive an acknowledgement from the neighbouring network node via the transit radio in response to the transmitted negotiation information;
  following receipt of the acknowledgement, forward data information to the transit radio for transmission to the neighbouring network node; and
  following transmission of the data information, receive negotiation information from the neighbouring network node via the transit radio;
wherein the transmitted and received negotiation information comprises information for establishing a future meeting at a subsequent meeting time between the network node and the neighbouring network node.

20. The wireless network node of claim 19, wherein the communications controller is further operable to obtain the communication medium for a meeting time by use of a contention based mechanism.

21. The wireless network node of claim 19, wherein the communications controller is further operable to obtain the communication medium for a meeting time by use of a contention free mechanism.

* * * * *

UNITED STATES PATENT AND TRADEMARK OFFICE
CERTIFICATE OF CORRECTION

PATENT NO. : 7,623,448 B1  Page 1 of 1
APPLICATION NO. : 11/293204
DATED : November 24, 2009
INVENTOR(S) : Vrzic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-sixth Day of October, 2010

David J. Kappos
*Director of the United States Patent and Trademark Office*